United States Patent [19]

Dormon-Brailsford

[11] Patent Number: 5,188,675
[45] Date of Patent: Feb. 23, 1993

[54] PAINT SYSTEM FOR REMOVING PAINT

[76] Inventor: Michael I. Dormon-Brailsford, Dorton Hill House, Chilton, Nr. Aylesbury, Bucks, HP18 9ND, United Kingdom

[21] Appl. No.: 799,686

[22] Filed: Nov. 22, 1991

Related U.S. Application Data

[63] Continuation of Ser. No. 624,610, Dec. 10, 1990, abandoned.

[30] Foreign Application Priority Data

Sep. 14, 1990 [GB] United Kingdom ............... 9020117

[51] Int. Cl.$^5$ .............................................. B08B 7/00
[52] U.S. Cl. ........................................ 134/4; 134/38; 252/153; 252/542; 252/174.23; 252/174.24; 252/170; 252/DIG. 8
[58] Field of Search ................... 134/4, 38; 252/153, 252/542, 174.23, 174.24, 170, DIG. 8

[56] References Cited

U.S. PATENT DOCUMENTS

| | | | |
|---|---|---|---|
| 3,762,953 | 10/1973 | Clarke, Jr. et al. | 252/170 |
| 3,950,185 | 4/1976 | Toyama et al. | 134/4 |
| 4,780,235 | 10/1988 | Jackson | 252/542 |
| 4,927,556 | 5/1990 | Pokorny | 252/170 |
| 5,024,780 | 6/1991 | Leys | 252/153 |
| 5,030,290 | 7/1991 | Davis | 252/542 |

FOREIGN PATENT DOCUMENTS 0389829 3/1990 European Pat. Off.

Primary Examiner—Theodore Morris
Assistant Examiner—Zeinab El-Arini
Attorney, Agent, or Firm—Grimes & Battersby

[57] ABSTRACT

A system for removing paint, varnish and the like which comprises: a stripper composition including an aliphatic dibasic acid ester, N-Methyl-2-Pyrrolidone, and an ingredient selected from the group consisting of propylene glycol methyl ether, dipropylene glycol methyl ether and a combination thereof. The composition may include propylene glycol and an acrylic polymer (or latex paint), either acetic acid or monoethanolamine, a surfactant and a thickening agent. In addition, the system includes an extender. The system may further include a laminated cover which comprises paper coated with polyethylene or wax.

12 Claims, No Drawings

PAINT SYSTEM FOR REMOVING PAINT

This is a continuation of co-pending application Ser. No. 07/624,610 filed on Dec. 10, 1990 now abandoned.

BACKGROUND OF THE INVENTION

1. Field of the Invention

The present invention relates generally to a paint system for stripping or otherwise removing one or more layers of cured coats of paint, varnish or the like from a surface which system utilizes environmentally safe chemicals that have an efficient rheology identical to that of paint. The present invention, more particularly, relates to such a system which has safer effective chemicals and greatly improved rheology to ensure even application.

It is well known in the art to remove or otherwise strip cured coatings of paint, varnish or the like chemically from surfaces by treating the coated surfaces with a stripper system or composition that includes volatile chlorinated hydrocarbons, such as methylene chloride, or strong alkaline, such as sodium hydroxide. Commercially available paint stripper compositions contain these ingredients or chemicals. While such ingredients provide effective paint stripping capabilities, their use presents problems for the environment.

Specifically, methylene chloride is a suspected carcingenic. Therefore, full protective clothing and breathing equipment is recommended when methylene chloride is used, especially in a confined area. Furthermore, the rapid evaporation of methylene chloride limits the dwell time, and thus the number of coats that can be removed in one application. Accordingly, this increases the amount of labor and material costs when removing multiple coats of paint. Also, certain surfaces, such as fiber glass, can be damaged by using paint removers containing methylene chloride.

It is believed that heretofore all types of chemical paint removers suffer from one serious drawback, that is the inability of the user to ensure an exactly even coating of the stripper composition so essential to an even paint strip, since an uneven strip requires further applications to remove all the paint.

While sodium hydroxide in a paint remover composition does not produce toxic fumes, it can cause serious burns on unprotected skin. Also, sodium hydroxide needs to be used in an alkaline water based system, therefore it will darken certain woods and, in addition, treated surfaces will need neutralizing.

2. Description of the Prior Art

U.S. Pat. No. 4,579,627 to Michael I. D. Brailsford, the inventor of the present invention, issued on Apr. 1, 1986. This patent, which is directed to a Paste Stripper System for Surfaces, provides a stripper composition system which uses methylene chloride in an amount between about 15 to 85 percent by weight of the total stripper composition. This patent also provides for the use of cover means to remove stripped paint.

U.S. Pat. No. 3,950,185 to Mitsuo Toyama, et al., issued on Apr. 13, 1976 and is titled Film Removing Compositions. This patent is directed to compositions which include at least one halogenated hydrocarbon solvent selected from a group including methylene chloride.

U.S. Pat. No. 4,426,250 also to Michael I.D. Brailsford, the inventor of the present invention, issued on Jan. 17, 1984. This patent, which is titled Stripper System for Surfaces, provides a stripper composition system which includes a one alkaline material, such as sodium hydroxide.

U.S. Pat. No. 1,581,413 to Raymond M. Yoakam, which issued on Apr. 20, 1926, is titled Paint and Varnish Removing Composition. This patent is directed to a composition for removing paint and varnish which composition contains eleven and one-eight ounces of sodium hydroxide.

There is commercially available from 3M a product called "Safest Stripper" for removing paint or vanish. This product includes a dibasic ester and aluminum silicate which is not found in the present system. Further, this product does not contain the N-Methyl-2-Pyrrolidone of the present system.

SUMMARY OF THE INVENTION

Against the foregoing background, it is a primary object of the present invention to provide a chemical system which can readily and effectively be used on a variety of surfaces to remove cured coatings of paint, varnish and the like.

It is another object of the present invention to provide such a chemical system which uses only environmentally safer chemicals than those heretofore used.

It is still another object of the present invention to provide such a chemical system which is a solvent based system thereby minimizing penetration of the system into the substrate.

It is yet another object of the present invention to provide such a chemical system which includes solvents that evaporate at rates consistent with the time needed to treat multiple layers of cured surface coatings with one application of the system.

It is yet another object of the present invention to provide such a chemical system which has a rheology identical to that of thixotropic paint so that a consistently even application of the chemical system or composition can be applied, vertically, horizontally, overhead or the like, without any dripping or sagging.

It is still yet another object of the present invention to provide such a chemical system which includes a pigment so as to make the treated surface more apparent.

It is still yet another object of the present invention to provide such a system which may include a laminated cover which is applied over the in situ composition to prevent evaporation in high temperatures and/or windy conditions, and to act as a collection vehicle for the stripped p int and the chemical system.

To the accomplishments of the foregoing objects and advantages, the present invention, in brief summary, includes a paint related chemical system for removal of surface coatings of paint, varnish and the like. The system includes a stripper composition which comprises an aliphatic dibasic acid ester, N-Methyl-2-Pyrrolidone, propylene glycol methyl ether and/or dipropylene glycol methyl ether, propylene glycol and a polymer for latex paint. This system may also include water, acetic acid or monoethanolamine, hydroxypropyl methylcellulose, and sodium dioctyl sulfosuccinate. The system, in addition, may include an extender, and may include a dye or pigment. As an alternative embodiment, the system may include a laminated cover which comprises a paper tissue coated with polyethylene or wax.

The system is formed in either of the following ways. In the first method, the solvents and thickeners are mixed together to produce a gel. The polymers, extenders and dyes are then added to the gel. The alternative method provides that the polymers are not included in the second stage and, instead, a latex paint is added within the range of ten (10) to twenty-five (25) percent by volume of the total system. Using either method, the resultant system is an easily brushable, pigmented, effective and safe paint remover or stripper composition.

DESCRIPTION OF THE PREFERRED EMBODIMENTS

The present invention, in brief summary, comprises a chemical system for decomposing and removing one or more cured coatings of paint, varnish, urethanes shellac, lacquers and the like from all types of surfaces. Specifically, the system has been found effective in removing most domestic and architectural paints and varnishes from brick, concrete, plaster, stucco, wood and the like. The chemical system has also been found effective in removing anti-fouling paints, especially from fiber glass, without damage to the matrix coat. Moreover, the chemical system is adapted to react on the painted surface for a relatively long period of time to decompose the cured paint, varnish and the like on the surface thereby facilitating removal thereof.

The present chemical stripper composition or system comprises a dibasic ester, N-Methyl-2-Pyrrolidone, propylene glycol methyl ether/or and dipropylene glycol methyl ether, a polymer and propylene glycol. The system may include an extender, water, acetic acid or monoethanolamine, a surfactant, a thickening agent or methyl cellulose material.

In a preferred embodiment, the present system includes water and acetic acid. In another preferred embodiment, the present system also includes a laminated cover.

The stripper composition has as its principal ingredient a dibasic ester or a blend of dibasic esters. The dibasic ester is the principal ingredient. The dibasic ester should be an aliphatic dibasic acid ester or esters. In the present composition, the dibasic ester should be present in an amount between about twenty (20) and about eighty (80) percent by volume of the total composition. It is preferred that the dibasic ester ingredient be a blend of dibasic esters in a amount about forty-eight (48) percent.

The aliphatic dibasic acid ester preferred in the present system is manufactured by DuPont Chemicals Inc. and sold under the name D.B.E. has the chemical formula $CH_3OOC(CH_2)nCOOCH_3$, n=3,4.

The second principal ingredient in the stripper composition is N-Methyl-2-Pyrrolidone. N-Methyl-2-Pyrrolidone serves as a safe solvent to the resins. It is present in an amount between about five (5) and about sixty (60) percent by volume of the total composition. In the preferred system, N-Methyl-2-Pyrrolidone is present in an amount about fifteen (15) percent by volume of the total composition. The preferred N-Methyl-2-Pyrrolidone is manufactured by GAF Corporation and sold under the name M.Pyrol Solvent.

The third principal ingredient is propylene glycol methyl ether and/or dipropylene glycol methyl ether. In a preferred embodiment, the third ingredient is a blend of propylene glycol methyl ether and dipropylene glycol methyl ether. The blend should be present in an amount between about five (5) and about seventy (70) percent by volume of the total composition. In the preferred embodiment, this blend is present in an amount about twenty (20) percent of the total composition. The ratio of the propylene glycol methyl ether to dipropylene glycol methyl ether in the blend is 3 to 1.

The blend of propylene glycol methyl ether and dipropylene glycol methyl ether serve in the present composition to give a higher solvency rate for polyurethane components of modern paint films.

Both the propylene glycol methyl ether and the dipropylene glycol methyl ether are commercially available from Dow Chemical Company. The propylene glycol methyl ether is sold under the name P.M. and the dipropylene glycol methyl ether is sold under the name D.P.M.

An additional ingredient is a polymer. If the polymer is not present, latex paint can be used. The purpose of the polymer is to improve the rheology to give an even film formation. The polymer is present in an amount between about three (3) and about twenty-five (25) percent by volume of the total composition. In the preferred system, the polymer is present in an amount about five (5) percent by volume of the total composition. The polymer can be an acrylic latex or polymer, methyl methacrylate, ethyl vinyl acetate or other similar polymers or copolymers. The preferred polymer is an acrylic polymer sold under the name Blend One by Rohm and Haas Company.

It has been found that the use of the latex paint instead of the polymer and extender combination, simplifies the manufacturing process and reduces the stock of materials. It has been found that the present stripper composition needs about five (5) percent of the polymer. When the latex paint is used instead of the polymer, the present stripper composition needs about twenty (20) percent latex paint. (For the purpose of the present application, latex paint contains on an average about twenty-three percent acrylic polymer and about thirty (30) percent titanium dioxide.)

Another ingredient that can and should be included in the present composition is an inorganic liquid. The preferred inorganic liquid is water. Specifically, water may be present in an amount between about one (1) and about twenty (20) percent by volume of the total composition. In the preferred embodiment, water is present in an amount about five (5) percent.

An ingredient that may be included in the present composition is propylene glycol. Propylene glycol is added to regulate the dwell time of the composition. When a latex paint is used instead of a polymer in combination with an extender, additional amounts of propylene glycol are needed. Propylene glycol should be present in an amount between about three (3) and about fifteen (15) percent by volume of the present stripper composition.

The following three ingredients may be present in the chemical system. If these present ingredients should amount to about five (5) percent of the total composition. Specifically, the three ingredients include about two (2) percent of acetic acid or monoethanolamine, about one (1) percent of a surfactant, and about (1) percent of a thickening agent.

The purpose of the acetic acid or the monoethanolamine is to act as a reagent. It is preferred that glacial acetic acid be used.

The purpose of the surfactant is to reduce the surface tension of the paint film and increase penetration. A preferred surfactant is Aerosol OT-S by American Cyanamid Company. This surfactant is commonly known as sodium dioctyl sulfosuccinate.

The purpose of the thickening agent is to increase viscosity and help prevent the composition from running or sagging. A preferred thickening agent is hydroxpropyl methylcellulose which is commercially available from Dow Chemicals Company.

The system of the present invention may also include an extender. An extender can be used when a polymer instead of latex paint is employed in the stripper composition. The purpose of the extender is to turn the system into a paint like product. Specifically, the extender makes the polymer have the same rheology as the latex paint. The extender is also used to make the composition provide an easily observable coating over the surface to be treated.

The extender can be one of the following: titanium dioxide, calcined clay, attapulgite clay, fumed silica, silica, mineral wool, mica, man-made fibers, such as, for example, nylon, polyester, polyethylene and the like, ceramic microspheres, and wood flour. It is preferred, however, that the extender be selected from the group consisting of titanium dioxide, calcined clay, mica, silica and ceramic microspheres. The most preferred extender is titanium dioxide.

To control properties of the stripper composition, a methyl cellulose material is used. The preferred material is hydroxypropyl methyl cellulose. This material may be present in an amount about one percent.

The system or composition may include, instead of the polymer and titanium dioxide, a commercial latex emulsion household paint. The paint should be included in an amount between about ten (10) to about twenty-five (25) percent by volume of the total system.

One preferred embodiment of the present system provides for a laminated cover or cover means. Cover means, which preferably is a cover blanket, is provided to cover the paint stripper composition for at least a portion of the time the composition remains on and treats the surface. The cover means is adapted to enhance the decomposition of the cured coats on the surface to be stripped, as well as to facilitate removal of at least a portion of the stripper composition and the decomposed surface coating. U.S. Pat. No. 4,579,627, mentioned previously, provides for the use of cover means which is different than that of the present application.

Specifically, the present application provides for a laminated cover. The laminated cover comprises a paper tissue coated with polyethylene or wax. The paper can be new or re-cycled paper. The combined weight of the coated paper should be between about 25 to about 150 grams per m2. The preferred combined weight is between about 30 to about 50 grams per m2.

The paper or at least a portion thereof sticks to the decomposed coat of paint, varnish or the like on the surface to be treated. When the laminated paper is pulled from the surface, the decomposed coat sticks thereto.

The resultant system is water soluble. Accordingly, the system is easy to work with or apply to the surface to be treated. Specifically, water can thin down a coat or layer of the system should the layer be too thick. Further, the system is water washable and water miscible.

A single application of the system has been found to remove from a surface, multiple coats of cured paint in the following way. The polymer enables the composition to form a skin by cross linkage on the outer surface. The heavy concentrations of high boiling solvents not only delays further drying, but decomposes the underlying cured paint. The resultant system provides a brushable, pigmented, multi-coat paint remover.

While the present composition can be made without acetic acid and water, it has been found that in the preferred composition both ingredients are included. The most preferred system of the present invention is as follows:

| Ingredient [liquid] | Percentage |
| --- | --- |
| Aliphatic dibasic acid esters | 48 |
| N-Methyl-2-Pyrrolidone | 15 |
| Blend of propylene glycol methyl ether and dipropylene glycol methyl ether | 20 |
| Acrylic polymer | 5 |
| Water | 5 |
| Acetic acid | 2 |

In this embodiment, the acrylic polymer used is an aqueous acrylic emulsion. An extender may be added. The preferred extender is titanium dioxide. A dye or pigment ca be added to help distinguish the treated surface from the untreated surface. This preferred system can be used with or without the laminated cover.

As stated previously, in an alternative embodiment, the polymer can be replaced by household latex paint. Further, anyone or all of the three additional ingredients, namely the acetic acid or monoethanolamine, the surfactant and the thickening agent can be used.

The preferred system is formed by mixing together the solvents and thickeners or thickening agent to produce a gel. The polymers, extenders and dyes are then added to the gel.

The alternative system provides that a modified latex paint is added within the range of ten (10) to twenty-five (25) percent by volume of the total system is used instead of the polymer.

Conventional methods can be used to apply the system to a surface to be treated. Specifically, it has been found that the system can be applied by the use of a brush, a roller, a conventional airless paint sprayer, a hopper gun or other spraying unit driven by compressed air or other mechanical means. A particularly preferred means of application is by the use of brush.

The success of the system depends upon the continuity or evenness of the thickness of the single layer of the system applied to the surface, not the number of coats of paint that is desired to be removed. Therefore, it is important to apply the system in a uniform and continuous manner over the entire surface to be treated. If so applied, the system of the present invention shall be effective in removing all layers of paint and the like from the surface with a single application of the system.

It has been found that a single application or layer of the system has removed multiple layers of cured paint and the like from surfaces. The following are examples of the results of only one application of the preferred system set forth above.

EXAMPLE 1

Late 19th century oak table covered with approximately 2 coats of acrylic water based paint and 4 coats of alkyd paint and vanish. One application of the composition was applied by brush to the cured paint and left for 30 minutes, after which time, the top coat coats of acrylic emulsion were already softened. After three hours, the underlying coats of alkyd paint and vanish were softened, and all the cured paint was easily removed, and the stripped surface lightly cleaned down with mineral spirits and wire wool.

EXAMPLE 2

17 year old, twelve foot fiber glass dingy, with approximately 4 coats of blue anti-fouling paint on the underside, and a similar number of coats of white acrylic paint on the topside. The stripper composition was applied to both top and underside, and left for 2 hours. The decomposed paints were then scraped off, and the surface easily cleaned with a scouring pad and water.

EXAMPLE 3

Section of a brick wall, approximately 20m2, in size and covered with multi-layers of acrylic and alkyd based paint. The stripper composition was sprayed through a typical airless paint sprayer to a thickness of 3 mm, and covered with the polyethylene and tissue laminate, previously described, and left for 24 hours. After which the laminate was removed complete with multi-layers of cured paint.

EXAMPLE 4

Painted plaster walls and ceiling within a room 4 m×6 m., with approximately 8 coats of acrylic emulsion paint on the walls and a "sandwich" of textured and emulsion paint on the ceiling. The stripper composition was applied with a paint roller on the walls and with a brush o the textured ceiling. The laminated cover was applied to the stripper composition on the ceiling only. Six hours later, the walls were scraped clean of all the paint, and the laminated cover was removed complete with textured/and emulsion paint and stripper composition, from the ceiling. No further treatment was necessary, prior to re-painting.

EXAMPLE 5

Section of a steel structure, totaling 8m2 in area, with approximately 10 coats of alkyd paint. The present paint stripper composition was sprayed on to a depth of 5mm. The laminated cover was then applied to half the sprayed area. The local temperature was warm, with strong winds. After 24 hours the treated surface was tested, and it was found that the stripper composition on the uncovered area has dried out, due to the exposed position of the structure, although about 5 coats of the paint, were softened and could be removed with a scraper. However, the stripper composition on the section protected by the cover, was still active, although not all the paint had decomposed. It was, therefore, left for a further 24 hours, by which time, all the paint was decomposed and could be removed with the cover.

EXAMPLE 6

A steel tank 2 m×1.5 m×1.5 m was filled to within 20 cm of the top with the stripper composition without thickener's extenders or polymers. A 50 year old small table coated with about 7 layers of oil paint, and 2 layers of varnish, was immersed in the tank containing the stripper composition, and left for 2 hours. After the 2 hours, the table was removed minus most of the paint, which had fallen off within the tank. The residue could easily be removed with steel wool.

As these examples illustrate, the system removes all cured paint from the surfaces with just one application. Also, all the described surfaces were carefully examined and were found to be completely free of any chemical residue, and neutralizing was unnecessary prior to re-treating the surface.

Having thus described the invention with particular reference to the preferred forms thereof, it will be obvious that various changes and modifications may be made therein without departing from the spirit and scope of the invention a defined by the appended claims. For instance, with some modification of the formula, special industrial paints can be decomposed by using more aggressive chemicals within the composition i.e., aromatic hydrocarbons, furfuryl alcohol, or even formic acid. The use of such chemicals would of course reduce the safety factor, but with proper safety precautions, the present composition effective range could be widened, and special variations of the composition could be made available.

Wherefore, I claim:

1. A process for removing coats of paint and varnish from a cured surface, comprising:

applying a stripper composition onto the surface to decompose the coats of paint and varnish on the surface, wherein said stripper composition includes an aliphatic dibasic acid ester in an amount between about twenty and about eighty percent by volume of said stripper composition, N-Methyl-2-Pyrrolidone in an amount between about five and about sixty percent by volume of said stripper composition, an ether selected from the group consisting of propylene glycol methyl ether, dipropylene glycol methyl ether and a blend of propylene glycol methyl and dipropylene glycol methyl ether in an amount between about five and about seventy percent by volume of said stripper composition, and a latex paint in an amount between about three and about twenty-five percent by volume of said stripper composition, wherein the latex paint contains on an average about twenty-three percent acrylic polymer and about thirty percent titanium dioxide, and wherein said stripper composition has a rheology the same as that of a thixotropic paint;

applying means for covering said stripper composition and the cured surface, said covering means including laminated paper tissue coated with either polyethylene or wax, said covering means having a face portion that is applied directly onto said stripper composition; and removing the decomposed coats of paint and varnish from the cured surface by lifting at least a portion of said covering means, whereby the lifted portion of said covering means has attached thereto at least a portion of the decomposed coats.

2. The process of claim 1, wherein said stripper composition further includes methyl cellulose to control properties of said stripper composition.

3. The process of claim 2, wherein said methyl cellulose is hydroxypropyl methyl cellulose.

4. The process of claim 2, wherein said methyl cellulose is present in an amount about one percent.

5. The process of claim 1, wherein said stripper composition further includes acetic acid and a surfactant.

6. The process of claim 1, wherein said stripper composition further includes propylene glycol.

7. The process of claim 1, wherein said stripper composition includes water in an amount between about one and about twenty percent by volume of said stripper composition.

8. The process of claim 7, wherein said water is present in an amount about five percent by volume of said stripper composition.

9. The process of claim 1, wherein said stripper composition further includes an extender.

10. The process of claim 9, wherein said extender is selected from the group consisting of titanium dioxide, calcined clay, attapulgite clay, fumed silica, silica, mineral wool, mica, man-made fibers, ceramic microspheres and wood flour.

11. The process of claim 9, wherein said extender is selected from the group consisting of titanium dioxide, calcined clay, mica, silica and ceramic microspheres.

12. The process of claim 9, wherein said extender is titanium dioxide and is present in an amount about twenty percent by volume of said stripper composition.

* * * * *